US011524700B2

(12) United States Patent
Oguro et al.

(10) Patent No.: US 11,524,700 B2
(45) Date of Patent: Dec. 13, 2022

(54) VEHICLE CONTROL SYSTEM, VEHICLE CONTROL METHOD, AND NON-TRANSITORY COMPUTER-READABLE STORAGE MEDIUM

(71) Applicant: HONDA MOTOR CO., LTD., Tokyo (JP)

(72) Inventors: Chihiro Oguro, Wako (JP); Katsuya Yashiro, Wako (JP); Ayumu Horiba, Wako (JP); Tadahiko Kanoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 189 days.

(21) Appl. No.: 16/913,402

(22) Filed: Jun. 26, 2020

(65) Prior Publication Data

US 2021/0001888 A1    Jan. 7, 2021

(30) Foreign Application Priority Data

Jul. 5, 2019  (JP) .............................. JP2019-126381

(51) Int. Cl.
*B60W 60/00*     (2020.01)
*B60W 30/12*     (2020.01)
(Continued)

(52) U.S. Cl.
CPC ........ *B60W 60/0017* (2020.02); *B60W 30/12* (2013.01); *B60W 60/0027* (2020.02);
(Continued)

(58) Field of Classification Search
CPC ....... B60W 60/0027; B60W 2554/801; B60W 50/14; B60W 2552/53; B60W 2754/20;
(Continued)

(56) References Cited

U.S. PATENT DOCUMENTS

2017/0192429 A1\*  7/2017  Tseng .................. G05D 1/0088
2018/0052458 A1\*  2/2018  Tsuji ................... B60W 30/143
(Continued)

FOREIGN PATENT DOCUMENTS

GB      2547972 A    \*  9/2017  .......... G05D 1/0088
JP      2017-165310 A    9/2017
(Continued)

OTHER PUBLICATIONS

"Driving You Crazy: Are we allowed to break the law when getting out of the way of emergency vehicles" by J. Luber, Dec. 11, 2017, downloaded from www.thedenverchannel.com/traffic/driving-you-crazy/driving-you-crazy-are-we-allowed-to-break-the-law-when-getting-out-of-the-way-of-emergency-vehicles (Year: 2017).\*

(Continued)

*Primary Examiner* — Peter D Nolan
*Assistant Examiner* — Tanya C Sienko
(74) *Attorney, Agent, or Firm* — Thomas | Horstemeyer, LLP

(57) ABSTRACT

A control system of a vehicle that can travel in a first state in which travel control is performed based on a position of a white line on a travel lane and in a second state in which travel control is performed based on a travel position of another vehicle. Periphery information is obtained of the vehicle. It is determined, based on the periphery information obtained, whether an emergency vehicle is approaching. A control unit configured to perform control so that travel control in the first state is prioritized when it is determined that the emergency vehicle is not approaching. Travel control in the second state is prioritized when it is determined that the emergency vehicle is approaching.

14 Claims, 6 Drawing Sheets

(51) Int. Cl.
*B60W 10/18* (2012.01)
*B60W 10/20* (2006.01)

(52) U.S. Cl.
CPC ............ *B60W 10/18* (2013.01); *B60W 10/20* (2013.01); *B60W 2554/402* (2020.02); *B60W 2554/404* (2020.02)

(58) Field of Classification Search
CPC ............ B60W 30/165; B60W 60/001; B60W 30/18009; B60W 2554/4045; B60W 60/0017; B60W 10/20
See application file for complete search history.

(56) References Cited

U.S. PATENT DOCUMENTS

| | | | |
|---|---|---|---|
| 2018/0137756 A1* | 5/2018 | Moosaei | G08G 1/0965 |
| 2018/0211528 A1* | 7/2018 | Seifert | G06V 20/56 |
| 2018/0334161 A1* | 11/2018 | Mizuno | B60W 10/04 |
| 2019/0039613 A1* | 2/2019 | Lee | G08G 1/167 |
| 2019/0049994 A1* | 2/2019 | Pohl | G08G 1/166 |
| 2019/0064934 A1* | 2/2019 | McQuillen | B60W 30/18163 |
| 2019/0187719 A1* | 6/2019 | El-Khatib | G08G 1/167 |
| 2019/0333381 A1* | 10/2019 | Shalev-Shwartz | G05D 1/0223 |
| 2020/0133280 A1* | 4/2020 | Seccamonte | B60W 60/0027 |
| 2020/0166950 A1* | 5/2020 | Hase | G05D 1/0088 |
| 2020/0398837 A1* | 12/2020 | Kumara | B60W 50/085 |
| 2021/0001888 A1* | 1/2021 | Oguro | B60W 30/165 |

FOREIGN PATENT DOCUMENTS

| | | | |
|---|---|---|---|
| JP | 2018-149872 A | 9/2018 | |
| JP | 2018149872 A * | 9/2018 | ........ B60W 30/165 |
| WO | 2018/163549 A1 | 9/2018 | |

OTHER PUBLICATIONS

Youtube presentation on Lane Keeping Assist system (Hyundai) https://youtu.be/hjzzuGY8ajU (Aug. 23, 2018) (Year: 2018).*

"Trajectory Planning with Velocity Planner for Fully-automated Passenger Vehicles" R. Solea and U. Nunes. Proceedings of the IEEE ITSC 2006, Toronto, Canada, Sep. 17-20, 2006 (Year: 2006).*

D. Bevly et al. "Lane Change and Merge Maneuvers for Connected and Automated Vehicles: a Survey" IEEE Transactions on Intelligent Vehicles vol. 1 Issue 1, pp. 105-120. pub. Jul. 20, 2016 (Year: 2016).*

"Lane Change and Merge Maneuvers for Connected and Automated Vehicles: A Survey" by D. Bevly et al. IEEE Transactions on Intelligent Vehicles (vol. 1, Issue: 1, pp. 105-120) pub. Mar. 1, 2016 (Year: 2016).*

Japanese Office Action (partial translation) for Japanese Patent Application No. 2019-126381 dated Feb. 26, 2021.

* cited by examiner

VEHICLE CONTROL SYSTEM, VEHICLE CONTROL METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2019-126381 filed on Jul. 5, 2019, the entire disclosure of which is incorporated herein by reference.

BACKGROUND OF THE INVENTION

Field of the Invention

The present invention relates to a vehicle control technique.

Description of the Related Art

Conventionally, it is known that a vehicle that supports driving support control can determine a position where the self-vehicle is to travel on a road in accordance with a travel environment detection result. For example, a travel position of the self-vehicle is determined in accordance with, for example, a position of a white line or the track of travel of a preceding vehicle. When the travel position is to be determined, it is not limited to a single reference, and the reference is switched so that the travel position will be determined based on the position of a detected white line in one situation and the travel position will be determined based on the track of travel of the preceding vehicle in another situation.

For example, Japanese Patent Laid-Open No. 2017-165310 discloses that the travel position will be determined so that the self-vehicle will follow the preceding vehicle in a case in which the self-vehicle has not recognized the position of the white line, and the travel position will be determined based on the travel position of the preceding vehicle and the position of the white line in a case in which the self-vehicle has recognized the white line.

As described above, the reference which is more suitable for determining the travel position will change in accordance with the detection state of the peripheral environment and the like. For example, an emergency vehicle such as an ambulance or the like may approach the self-vehicle when the self-vehicle is traveling. In such a situation, the self-vehicle needs to perform an operation to give way to the emergency vehicle by opening up a space for the emergency vehicle to travel.

SUMMARY OF THE INVENTION

Thus, an object of the present invention is to provide appropriate travel control to a self-vehicle in a case in which an emergency vehicle is present in the periphery.

According to an aspect of the present invention, there is provided a control system of a vehicle that can travel in a first state in which travel control is performed based on a position of a white line on a travel lane and in a second state in which travel control is performed based on a travel position of another vehicle, comprising: an obtainment unit configured to obtain periphery information of the vehicle; a determination unit configured to determine, based on the periphery information obtained by the obtainment unit, that an emergency vehicle is approaching; and a control unit configured to perform control so that the travel control by the first state is prioritized when the determination unit determines that the emergency vehicle is not approaching, and so that the travel control by the second state is prioritized when the determination unit determines that the emergency vehicle is approaching.

Further features of the present invention will become apparent from the following description of exemplary embodiments (with reference to the attached drawings).

DESCRIPTION OF THE EMBODIMENTS

Figure 1:
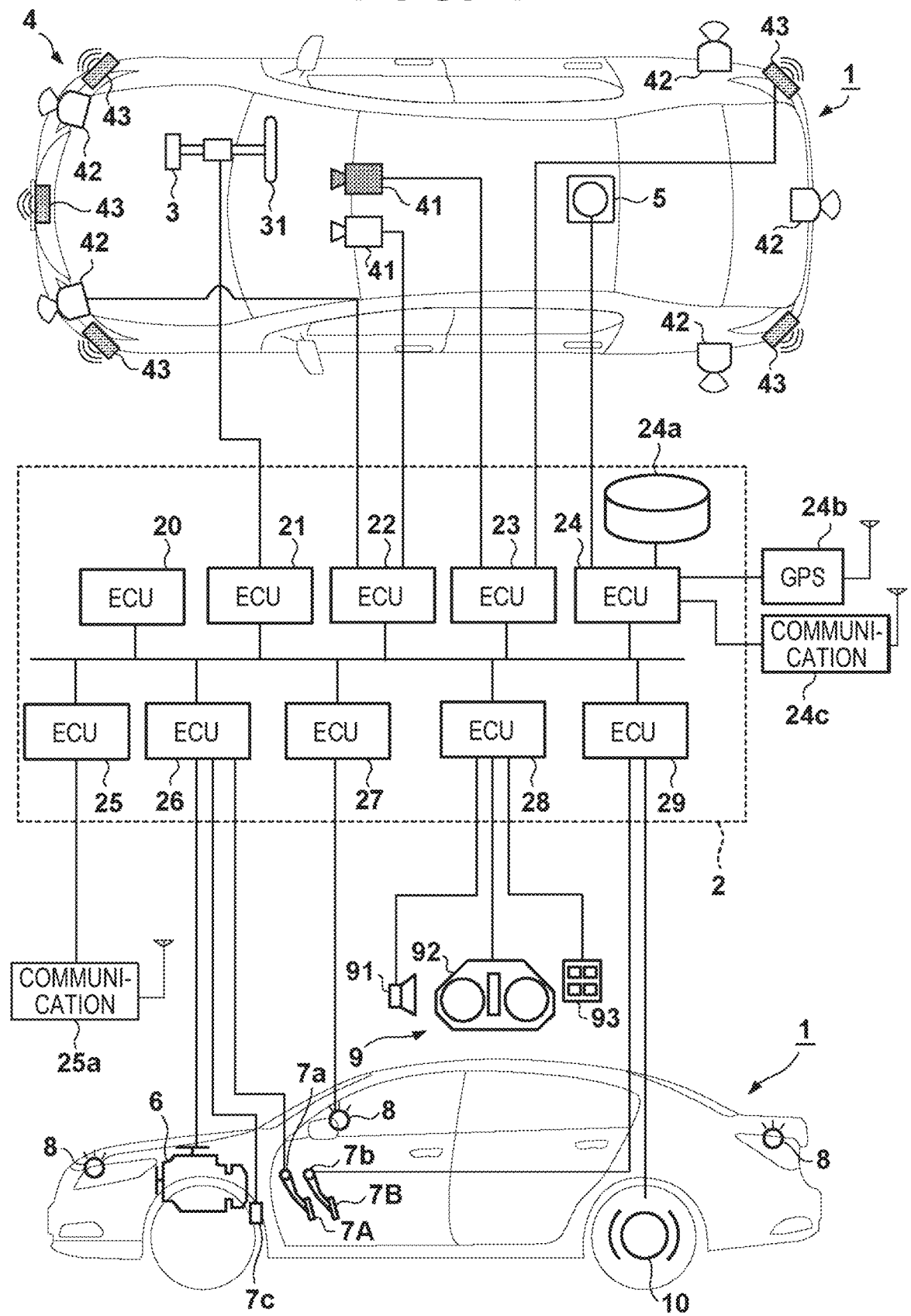
FIG. 1 is a block diagram of a vehicle control apparatus according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

[Vehicle Arrangement]

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

A vehicle control apparatus of FIG. 1 includes a control system 2. The control system 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed, and they can be subdivided or integrated as compared to this embodiment. Although an arbitrary method can be adopted as a method of installing a program to be executed by each ECU, it is possible to use, for example, a storage medium such as a CD-ROM, a DVD, or the like to perform the installation.

The ECU 20 executes control associated with automated driving of the vehicle 1. In automated driving, at least one of steering and acceleration/deceleration of the vehicle 1 is automatically controlled. Both steering and acceleration/deceleration are automatically controlled in the control example to be described later.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. When the driving state of the vehicle 1 is automated driving or driving support, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted. Each detection unit 41 also has, in addition to the image capturing function, a function as a sound detection unit (a microphone or the like) that obtains a sound. Hence, assume that each detection unit 41 can obtain the sound information of the peripheral environment. Note that processing of the obtained sound information can be performed separately from image analysis.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LiDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LiDARs, and radars are provided, the peripheral environment of the vehicle can be analyzed multilaterally. The ECU 23 also performs processing of the sound information obtained by each detection unit 41. For example, a sound emitted from a vehicle traveling in the periphery of the self-vehicle can be analyzed to recognize the characteristics or the like of the peripheral vehicle. As a result, it is possible to recognize whether a specific vehicle (an emergency vehicle such as an ambulance, a police car, or the like) is present nearby.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle on the periphery and performs information exchange between the vehicles. For example, the communication device 25a may communicate with an emergency vehicle to obtain information about the presence, the travel path, and the like of the emergency vehicle and detect that the emergency vehicle is approaching the self-vehicle. The ECU 23 and the ECU 25 may determine the degree of urgency when the information related to the emergency vehicle has been obtained. For example, the ECU 25 may also receive, via the communication device 25a, information that the degree of urgency is high, and make a determination based on this information. In addition, the ECU 23 may determine the degree of urgency based on the distance of proximity to the emergency vehicle, the volume of the sound of a siren, or the like.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. When the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. When the driving state of the vehicle 1 is automated driving or driving support, the ECU 29 automatically controls the brake device 10 in correspondence with an instruction from the ECU 20 and controls deceleration and stop of the vehicle 1. The brake device 10 or the parking brake can also be operated to maintain the stopped state of the vehicle 1. In addition, if the transmission of the power plant 6 includes a parking lock mechanism, it can be operated to maintain the stopped state of the vehicle 1.

[Examples of Control Functions]

The control functions of the vehicle 1 according to this embodiment include traveling-associated functions associated with the control of driving, braking, and steering of the vehicle 1, and notification functions associated with the notification of information to the driver. Note that a plurality of control levels may be arranged for each control function in accordance with the performance or the like of the vehicle 1.

Examples of traveling-associated functions are vehicle speed maintenance control, acceleration/deceleration timing control, lane maintenance control, lane departure suppression control (road departure suppression control), lane change control, vehicle following control, collision reduction brake control, and erroneous start suppression control. Examples of the notification functions are adjacent vehicle notification control and preceding vehicle start notification control, and driving takeover request notification control.

Vehicle speed maintenance control is control performed to maintain travel at a predetermined vehicle speed. For example, the accelerator pedal and the brake pedal are controlled to maintain the vehicle speed in accordance with the changes in the external environment and the shape of the road on which the self-vehicle is traveling. Acceleration/ deceleration timing control is control performed to determine the acceleration/deceleration timing of the vehicle in consideration of the state of the travel of the vehicle and the shift to another operation state. For example, since the acceleration/deceleration timings will change depending on the curvature of a curve, the shape of a road, the travel position, and the like even if the same operation is to be performed, these timings will be controlled. In addition, vehicle speed maintenance control and acceleration/deceleration control can be combined to perform vehicle speed control that can bring the vehicle speed closer to a target travel speed.

Lane maintenance control is one of control processes for the position of the vehicle with respect to a lane. This control makes the vehicle automatically travel (without depending on the driving operation of the driver) on the track of travel set on a lane. Lane departure suppression control is one of control processes for the position of the vehicle with respect to a lane. In lane departure suppression control, steering control is automatically performed so the vehicle will not go across a white line or a road boundary (a median strip, plantings (road verge), a curb, or the like) when such a line has been detected. The function of the lane departure suppression control and the function of the lane maintenance control differ in this manner.

Lane change control is control performed to automatically move the vehicle from the lane on which the vehicle is traveling to an adjacent lane. Lane change control can be repeatedly performed to move the vehicle over a plurality of lanes, and to make the vehicle return to the original lane after temporarily making a lane change to the adjacent lane. Vehicle following control is control of automatically following another vehicle traveling in the periphery of the self-vehicle. In this case, although a preceding vehicle that is traveling in front of the self-vehicle will mainly be set as the target other vehicle, a vehicle following the self-vehicle may also be set as the target depending on the situation. Collision reduction brake control is control that supports collision avoidance by automatically braking the vehicle when the possibility of collision with an obstacle which is ahead of the vehicle increases. Erroneous start suppression control is control to suppress an abrupt start by limiting the acceleration of the vehicle in the stopped state of the vehicle when the acceleration operation by the driver is a predetermined amount or more.

Adjacent vehicle notification control is control of notifying the driver of the presence of another vehicle traveling on the adjacent lane which is adjacent to the travel lane of the self-vehicle. The driver is notified of, for example, the presence of another vehicle traveling on a lateral side or the rear side of the self-vehicle. Preceding vehicle start notification control is control performed to notify the driver that another vehicle ahead has started when the self-vehicle and another vehicle ahead are in a stopped state. Driving takeover request notification control is control performed when the travel mode of the vehicle 1 is to be changed so that an operation request will be made to the driver (occupant) before and after the change in the travel mode. Since the contents of an operation requested to the driver will differ in accordance with the travel mode, the notification contents and the notification timing may be changed in accordance with the contents of the requested operation before and after the change in the travel mode. These notifications can be made by in-vehicle notification devices.

[Travel Control]

Control according to this embodiment will be described hereinafter. A case in which the self-vehicle is traveling by following a preceding vehicle, a case in which the self-vehicle is automatically traveling based on a detected white line position, and the like will be considered. In a case in which an emergency vehicle such as an ambulance or a police car has approached the self-vehicle from the front side or the rear side in such situations, the self-vehicle will need to perform an operation to ensure the travel space of the emergency vehicle to give preference to the emergency vehicle and let the emergency vehicle pass. In this case, the self-vehicle will need to travel at a position which is different from the normal travel position based on the preceding vehicle or the white line position.

In this embodiment, in a case in which an emergency vehicle is positioned in the periphery of the self-vehicle, control which is different from the normal travel support control will be performed to determine the travel position of the self-vehicle. In this embodiment, two references will be exemplified as the references to be used when the travel position of the self-vehicle is to be determined.

The first reference is a travel position based on the white line detected from the road on which the self-vehicle is traveling (to be referred to as white line tracing hereinafter). This is executed by the lane departure suppression control and lane maintenance control described above. In this case, the travel position of the self-vehicle is determined based on the position(s) of the white line(s) detected on both sides or on one side of the road. In a case in which the white lines on both sides of the road have been detected, the center position between these white lines is set as the travel position. Also, in a case in which the white line on one side of the road has been detected, the center position of the road, which is determined based on the position of this white line and information of the road width obtained from the map information or the like, is set as the travel position. In a case in which only a white line on one side of the road has been detected, the travel position may be determined based on a predetermined offset amount from the position of this white line.

Figure 2B:
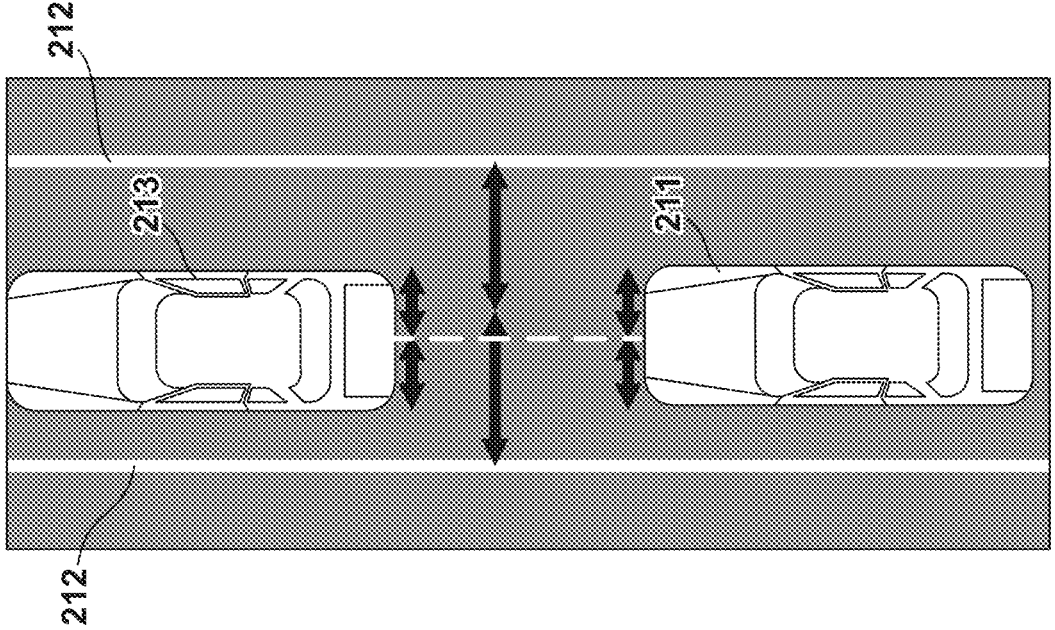
FIGS. 2A and 2B are views for explaining white line tracing and track tracing.
Figure 2A:
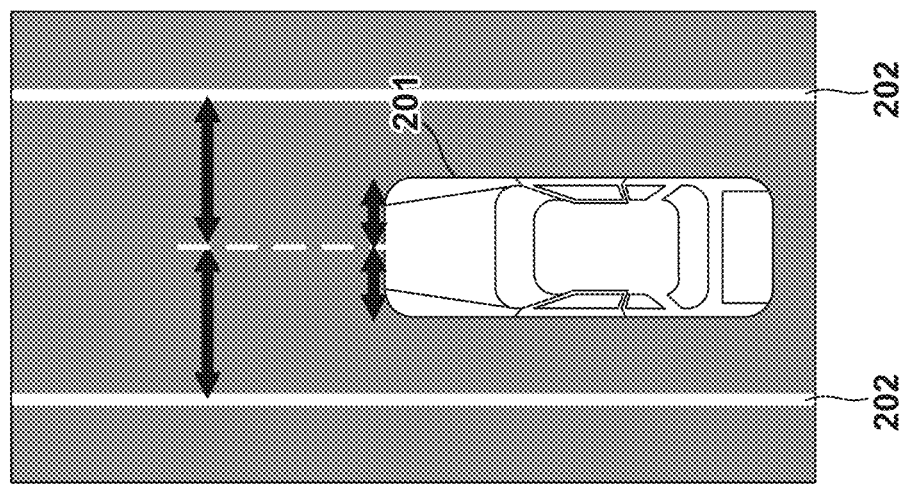

FIG. 2A is a view for explaining the travel position based on the white line. Assume here that left and right white lines 202 have been detected on the road on which a vehicle 201 is traveling. In this case, the vehicle 201 will determine the travel position so that the center position of the self-vehicle will be the center position between the white lines 202.

The second reference is a travel position based on the travel position of a preceding vehicle in a case in which the self-vehicle is traveling by following the preceding vehicle or the like (to be referred to as track tracing hereinafter). This is executed by the vehicle following control function described above. In this case, the travel position of the self-vehicle is determined by specifying the center position of the preceding vehicle and following this center position.

FIG. 2B is a view for explaining the travel position based on the travel position of the preceding vehicle. Assume here that a vehicle 211 has detected the travel position (track of travel) of a preceding vehicle 213. The detection of left and right white lines 212 of the road on which the self-vehicle is traveling on may also be performed together with this detection. In this case, the vehicle 211 determines the travel position so that the center position of the self-vehicle will be the center position of the preceding vehicle 213. At this time, the center position of the left and right white lines 212 and the travel position of the vehicle 211 may match or may have some difference between them.

The vehicle according to this embodiment is a vehicle that can execute travel support control based on the two references described above by switching the control operations in accordance with the detection state of the peripheral environment. In this embodiment, travel support control based on white line tracing is preferably performed during a normal state, and travel support control based on track tracing will be performed when it is difficult to detect the white line or the like. On the other hand, the travel support control based on track tracing will be preferably executed when an emergency vehicle is approaching the self-vehicle. Also, when switching between white line tracing and track tracing, the travel position will be determined based on both the white line tracing and the track tracing to prevent the travel position from changing rapidly in a short period of time. Furthermore, during the switching, the transition will be performed with respect to the application ratio of the white line tracing and the track tracing so that the ratio of the track tracing will be gradually increased along with the elapse of time.

Figure 3:
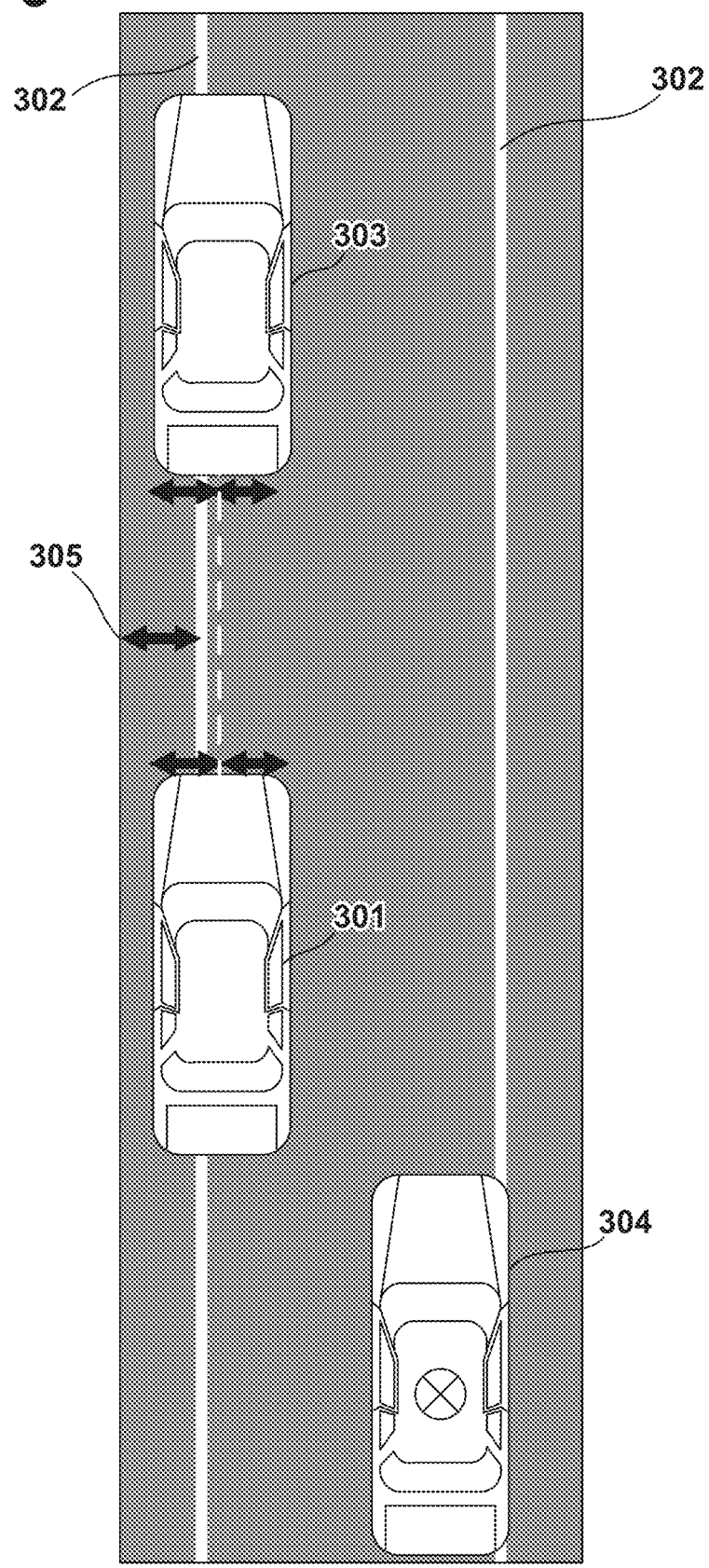
FIG. 3 is a view for explaining an operation performed when an emergency vehicle is approaching a self-vehicle according to the first embodiment.

FIG. 3 is a view for explaining a situation in which an emergency vehicle 304 is approaching a vehicle 301 from the rear right side in the periphery of the vehicle 301. In this embodiment, in a case in which the emergency vehicle 304 is approaching the self-vehicle, the vehicle 301 will determine the travel position based on the travel position of a preceding vehicle 303 by track tracing as described in FIG. 2B. In this case, when the preceding vehicle 303 makes an operation to approach the travel path of the emergency vehicle 304, track tracing corresponding to this operation will be suppressed. Hence, when the preceding vehicle 303 makes an operation to give way to the travel path of the emergency vehicle 304, the track tracing will be performed based on this operation. As a result, a travel space can be opened up (an offset operation) to allow the emergency vehicle 304 to pass. Note that in a normal track tracing operation, a restriction will be placed so a position which can cause the self-vehicle to straddle a white line 302 will not be determined as the travel position. However, in the aforementioned situation, the travel position can be determined so that the self-vehicle will go across the white line 302 and use a space (for example, a shoulder 305) which is outside of the white line 302. In this case, a range to be permitted as the travel position or a range in which the self-vehicle is allowed to straddle the white line may be determined by considering the width of the shoulder 305, the shape of the road, and the like.

[Processing Procedure]

Figure 4:
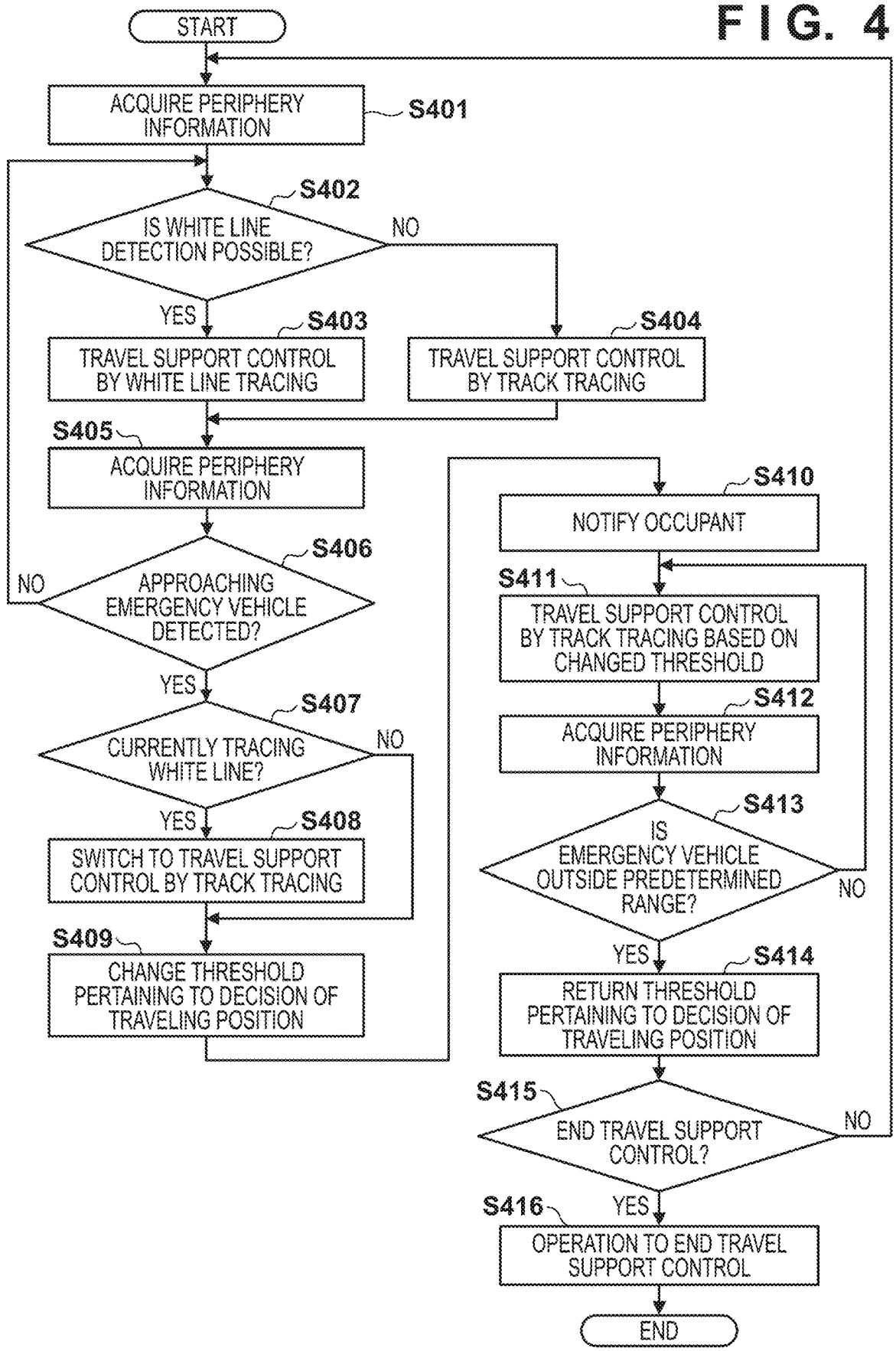
FIG. 4 is a flowchart of control processing according to the first embodiment.

FIG. 4 will be used to describe the processing procedure of the control processing according to this embodiment. Although various kinds of ECUs and the like included in the vehicle as described above will cooperate to perform processing in each control operation of this processing procedure, the control system 2 of the vehicle 1 will be indicated as the processing subject in this case for the sake of descriptive convenience. Assume that the processing procedure is started in accordance with the start of the travel support control.

In step S401, the control system 2 uses each detection unit to obtain the periphery information of the peripheral environment in which the self-vehicle is traveling. As described above, in this case, the position(s) of white line(s) of the road on which the self-vehicle is traveling, information related to peripheral vehicles, and the like are obtained.

In step S402, the control system 2 determines, based on the periphery information obtained in step S401, whether the white line(s) of the road can be detected. In this case, it can be determined that the white line(s) can be detected as long as at least one of the left and right white lines of the road is detected. When it is determined that the white line(s) can be detected (YES in step S402), the process advances to step S403. When it is determined that the white line(s) cannot be detected (NO in step S402), the process advances to step S404.

In step S403, the control system 2 makes settings to perform travel support control by white line tracing, as described in FIG. 2A, and starts the travel control. Subsequently, the process advances to step S405.

In step S404, the control system 2 sets settings to perform travel support control by track tracing based on the track of a preceding vehicle upon determining the preceding vehicle which is to be the following target as described in FIG. 2B, and starts the travel control. The following target in this case may be the preceding vehicle which is at a position closest to the self-vehicle among the vehicles traveling on the same lane. Subsequently, the process advances to step S405.

In step S405, the control system 2 obtains the periphery information of the peripheral environment in which the self-vehicle is traveling. Although this process may be similar to that performed in step S401, assume that at least the information related to the approach of an emergency vehicle will be obtained in this processing. More specifically, the periphery information may be obtained by detecting a sound (a siren or the like) emitted by the emergency vehicle. Detection of the warning lights may also be performed together with the detection of the sound of the siren. Alternatively, it may be arranged so that the approach of the emergency vehicle will be detected by inter-vehicle communication or communication with an external device.

In step S406, the control system 2 determines, based on the periphery information obtained in step S405, whether the emergency vehicle is approaching the self-vehicle. For example, since the emergency vehicle emits a predetermined sound such as a siren or the like during an emergency, the self-vehicle can detect the change in the volume of the sound of the siren in accordance with the approach of the emergency vehicle. The control system may also determine the direction (from the front side, the rear side, or the like) from which the emergency vehicle is approaching. When it is detected that the emergency vehicle is approaching (YES in step S406), the process advances to step S407. Otherwise (NO in step S406), the process returns to step S402, and the processing is repeated.

In step S407, the control system 2 determines whether the current travel support control is travel support control by white line tracing. When it is determined that the current travel support control is the travel support control by white line tracing (YES in step S407), the process advances to step S408. When it is determined that the current travel support control is not the travel support control by white line tracing (that is, is the travel support control by track tracing) (NO in step S407), the process advances to step S409.

In step S408, the control system 2 switches the current travel support control to the travel support control by track tracing. At this time, the preceding vehicle to be the following target will be determined when the travel support control is switched to the travel support control by track tracing. A target vehicle to be determined as the preceding vehicle is, for example, a vehicle which is traveling on the same lane as the self-vehicle and is a vehicle positioned within a predetermined distance from the self-vehicle. Furthermore, it will be a vehicle that has started an operation to move in a lateral direction from the center position of the lane in accordance with the detection of the presence of the emergency vehicle. Also, to stabilize the travel control of the self-vehicle, assume that the travel support control will be switched, step by step, to travel support control by track tracing by using both track tracing and white line tracing, so that the travel position will be prevented from changing rapidly due to the switching operation. Note that this processing step may be continued until the preceding vehicle which is to be the target of the track tracing is determined.

In step S409, the control system 2 changes a threshold related to the determination of the travel position. In this case, in the changing of the threshold, the travel position is determined without using the region outside the white line in a travel support control operation by the normal track tracing as described in FIG. 3. In contrast, in a case in which an emergency vehicle is approaching the self-vehicle, such a region can be effectively used to provide a travel space for the emergency vehicle. Hence, in this embodiment, the threshold will be changed to increase the range related to the determination of the travel position which is normally restricted. That is, the range that is permitted as the range in which the vehicle can travel will be eased temporarily. Furthermore, the threshold to be set in this case may be a limit value with respect to an amount of movement in a lateral direction within a predetermined time. Although a rapid movement in the lateral direction is restricted to provide a sense of security to the occupant when the self-vehicle is traveling normally, it may be set so that the limit value will be eased in a case in which an emergency vehicle is approaching the self-vehicle. Note that the limit value may be determined in accordance with the distance between the self-vehicle and the emergency vehicle. It may also be arranged so that functions by the lane departure suppression control and the lane maintenance control described above will be stopped.

In step S410, the control system 2 uses the display device 92 and the like to notify the occupant of the self-vehicle that an emergency vehicle is approaching and that travel support control with respect to this approaching emergency vehicle will be executed. Although the notification contents are not particularly limited in this case, for example, display or a voice may be output to notify the occupant of the direction in which the emergency vehicle is approaching and the fact that travel will be performed by using a space such as the shoulder or the like.

In step S411, the control system 2 uses the threshold set in step S409 to perform travel support control by track tracing. For example, in a case in which the preceding vehicle moves to a travel position straddling the shoulder portion to provide a travel space for the emergency vehicle, the travel position of the self-vehicle will be controlled in accordance with this movement.

In step S412, the control system 2 obtains the periphery information of the peripheral environment in which the self-vehicle is traveling. This process may be similar to that in step S405.

In step S413, after the emergency vehicle is in the proximity of the self-vehicle, the control system 2 determines whether the emergency vehicle has fallen outside a predetermined range. The predetermined range in this case can be determined in accordance with the direction in which the emergency vehicle has approached the self-vehicle. For example, if the emergency vehicle has approached the self-vehicle from the rear side, it may be determined that the emergency vehicle has fallen outside the predetermined range at the point when the emergency vehicle has passed the preceding vehicle which the self-vehicle is following by track tracing. Also, if the emergency vehicle has approached the self-vehicle from the front side, it may be determined that the emergency vehicle has fallen outside the predetermined range at the point when the emergency vehicle has passed the self-vehicle. In addition, it may be determined that the emergency vehicle has fallen outside the predetermined range at the point when it has been detected that the distance between the position of the self-vehicle and the position of the self-vehicle has increased. When it is determined that the emergency vehicle has fallen outside the predetermined range (YES in step S413), the process advances to step S414. When it is determined that the emergency vehicle is within the predetermined range (NO in step S413), the process returns to step S411, and the travel support control by track tracing is continued.

In step S414, the control system 2 returns the threshold set in step S409 to the threshold of the normal travel support control. For example, it will be set so the region (the shoulder or the like) outside the white line will not be used when the travel position is to be determined.

In step S415, the control system 2 determines whether to end the travel support control. In this case, whether to end the travel support control may be determined based on an instruction by the occupant of the self-vehicle or in accordance with a condition or the like for continuing the travel support control. When it is determined that the travel support control is to be ended (YES in step S415), the process advances to step S416. When it is determined that the travel support control is to be continued (NO in step S415), the process returns to step S401, and the travel support control is continued.

In step S416, the control system 2 performs an operation to end the travel support control. For example, control to perform a driver takeover operation may be executed upon notifying the occupant (the driver) by performing a driving takeover request. Subsequently, this processing procedure ends.

As described above, according to this embodiment, in a case in which an emergency vehicle approaches the self-vehicle while travel support control is being executed, it is possible to provide appropriate travel control so that the flow of traffic on the road will be smooth.

Second Embodiment

The first embodiment had an arrangement in which travel support control by track tracing is performed when an emergency vehicle is approaching. This embodiment will further describe a mode in which the vehicle to be the target of track tracing is changed based on the direction of the approach when the emergency vehicle is approaching. Note that a description of arrangement that overlaps that of the first embodiment will be omitted, and only the differences will be described.

In a case in which travel support control by normal track tracing is to be performed, a vehicle at a position closest to the self-vehicle among the vehicles traveling in the front of the self-vehicle on the same lane is set as the following target. In contrast, in this embodiment, control to switch the vehicle which is to be the track tracing target will be performed when an emergency vehicle is approaching. More specifically, in a case in which the emergency vehicle is approaching from the rear side of the self-vehicle, the travel position will be determined by also performing track tracing with respect to a vehicle which is following the self-vehicle.

[Processing Procedure]

Figure 5:
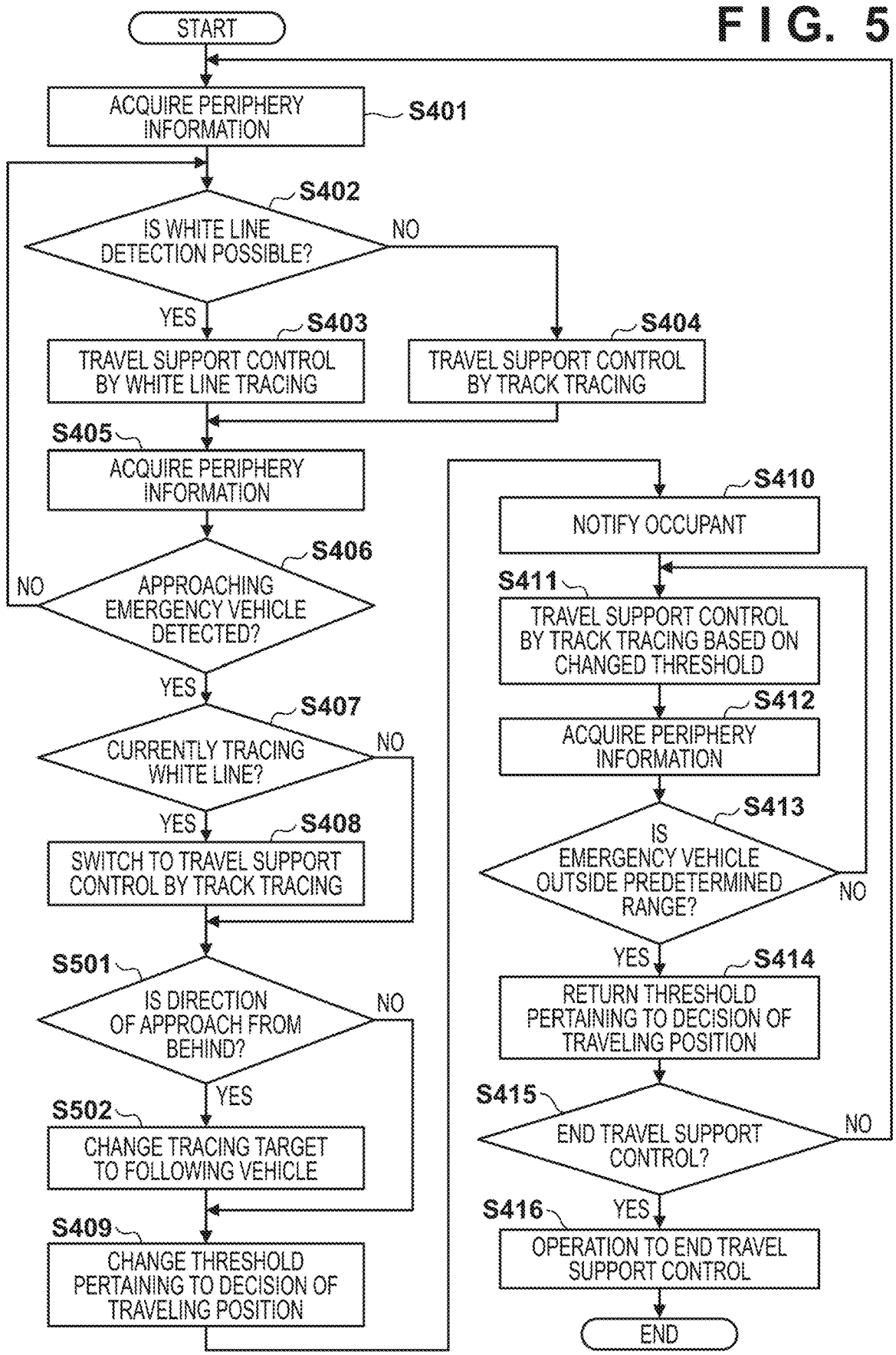
FIG. 5 is a flowchart of control processing according to the second embodiment.

The processing procedure of the control processing according to this embodiment will be described with reference to FIG. 5. Although various kinds of ECUs and the like included in the vehicle as described above will cooperate to perform processing in each control operation of this processing procedure, a control system 2 of a vehicle 1 will be indicated as the processing subject in this case for the sake of descriptive convenience. Note that the same reference numerals denote processes which are the same as the processes described with reference to FIG. 4 in the first embodiment, and a description will be omitted. Assume that the processing procedure is started in accordance with the start of the travel support control.

The process advances to step S501 when it has been determined that the track tracing is being executed (NO in step S407) in step S407 and after the process of step S408 has been completed. In step S501, the control system 2 determines whether the direction in which the emergency vehicle is approaching is in the rear side of the self-vehicle. The direction of the approach may be determined here based on, for example, the direction in which the sound of the siren or the like has been detected. When it is determined to be the rear side (YES in step S501), the process advances to step S502. Otherwise (NO in step S501), the process advances to step S409.

In step S502, the control system 2 changes the track tracing target from the preceding vehicle on the front side of the self-vehicle to the following vehicle on the rear side of the self-vehicle. That is, a vehicle on the side in which the emergency vehicle is approaching is set as the track tracing target. The following vehicle in this case is a following vehicle at a position closest to the self-vehicle. Note that this change operation does not cancel the track tracing performed up to this point with respect to the preceding vehicle, and the track tracing of the preceding vehicle may be performed together with the track tracing of the following vehicle. In such a case, the travel position will be determined by prioritizing the track of the following vehicle. Subsequently, the process advances to step S409.

Note that in a case in which it is determined that the travel support control is to be continued in step S415 (NO in step S415) after the track tracing target has been changed to the following vehicle, control will be performed so that the preceding vehicle will be set as the track tracing target when track tracing is to be performed again (step S404).

As described above, by setting a vehicle, which is positioned in the direction in which the emergency vehicle is approaching, as the track tracing target, the position of the self-vehicle can be determined in accordance with the position of the vehicle in this direction. Hence, a safer travel space can be provided for the emergency vehicle.

As described above, according to this embodiment, an appropriate travel position can be determined in accordance with the direction in which an emergency vehicle is approaching. As a result, the flow of traffic on the road can become smooth.

Note that the track tracing target is changed in accordance with the direction in which an emergency vehicle is approaching in the above description. Furthermore, it may be arranged so that the vehicle to be the track tracing target will be switched based on the size (width) of the vehicle that is set as the track tracing target and the size (width) of the self-vehicle when an emergency vehicle is approaching. More specifically, in a case in which the difference between the size (width) of the vehicle that is set as the track tracing target and the size (width) of the self-vehicle is larger than a predetermined threshold, the track tracing target may be changed to a vehicle which is closer to the size of the self-vehicle. As a result, the self-vehicle will also be able to determine the travel position based on the travel position of a vehicle whose size close to the size of the self-vehicle.

Third Embodiment

The first embodiment described an arrangement in which travel support control by track tracing is performed when an emergency vehicle is approaching. At this time, control is performed so that the center position of the self-vehicle will match the center position of the preceding vehicle as shown in FIG. 3. The third embodiment will describe an example of determining the travel position which is different from that exemplified in the above-described embodiments.

Figure 6A:
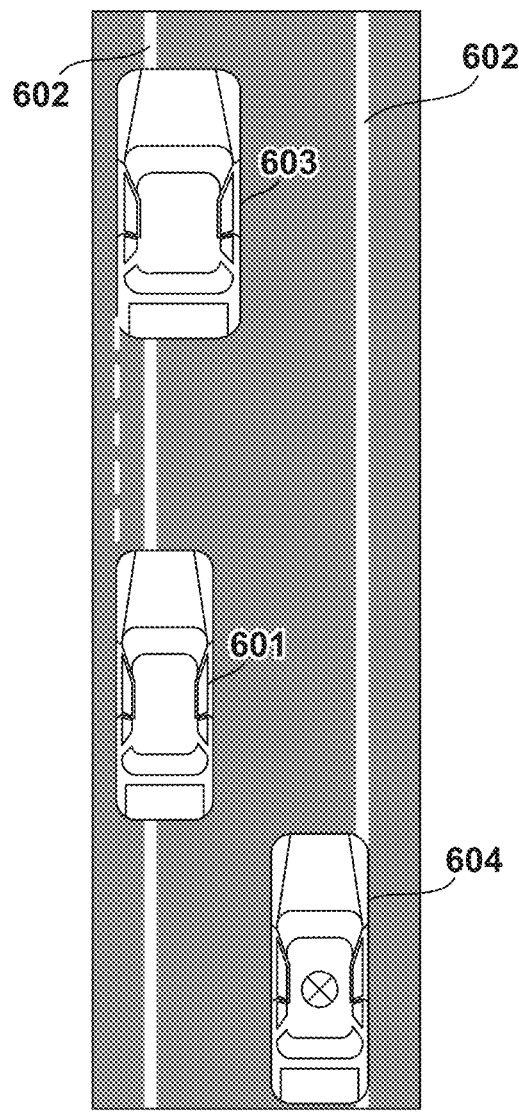
FIGS. 6A and 6B are views for explaining track tracing according to the third embodiment.

FIG. 6A is a view for explaining a situation in which an emergency vehicle 604 is approaching a vehicle 601 from the rear right side in the periphery of the vehicle 601 according to this embodiment. Assume that the vehicle width of a preceding vehicle 603 to be the track tracing target is larger than the vehicle width of the vehicle 601. Also assume that the positions of white lines 602 have been detected.

In this case, the travel position of the vehicle 601 can be determined to be a travel position where the left end of the vehicle 601 matches the left end (that is, a side opposite to the side on which the emergency vehicle 604 is approaching) of the preceding vehicle 603. As a result, the distance between vehicles when the emergency vehicle 604 is to pass the vehicle 601 will be greater than the distance between vehicles when the emergency vehicle 604 is to pass the preceding vehicle 603 so that a safer travel position can be implemented.

Note that although the travel position of the self-vehicle is determined so that the left end of the self-vehicle will match the left end of the preceding vehicle in the example of FIG. 6A, the travel position may be determined so that the right end of the self-vehicle will match the right end of the preceding vehicle. Since the amount of movement of the vehicle 601 in the lateral direction will decrease when opening the travel space for the emergency vehicle 604, the time of the movement can be reduced. Whether the left end or the right end of the vehicle is to be matched may be switched in accordance with the detection accuracy (state) of the peripheral environment. For example, control may be performed so as to match the travel position to the left end in a case in which the detection accuracy of a shoulder positioned on the left side of the vehicle is high. On the other hand, control may be performed so as to match the travel position to the right end in a case in which the detection accuracy of the shoulder is low. At this time, a state in which the detection accuracy is high is a state in which the width of the shoulder is being stably obtained in a measurement executed in time series and the change in the width of the shoulder is less than a predetermined threshold. Note that the reference to be used in the switching is not limited to that described above, and may be determined based on another piece of peripheral environment information.

Figure 6B:
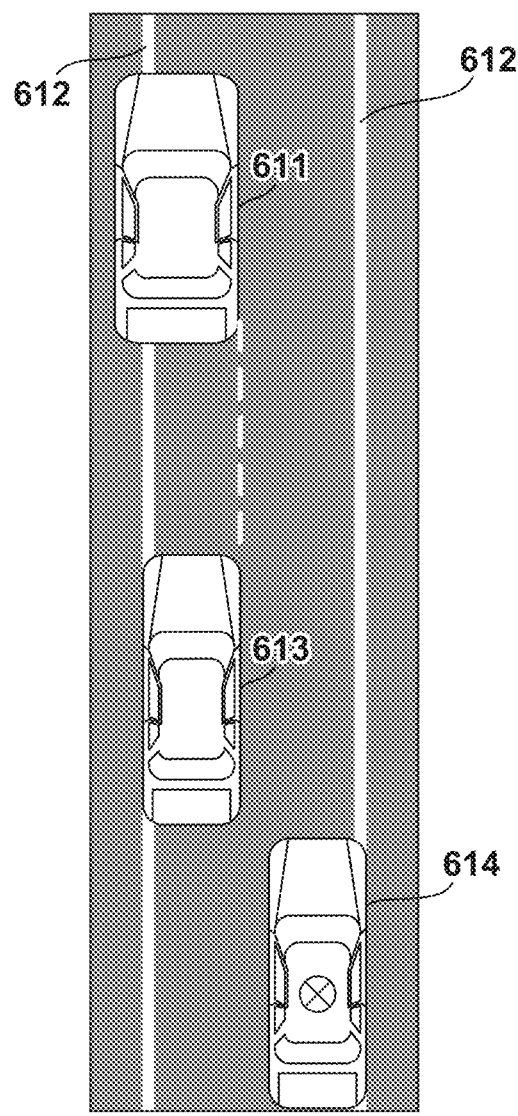

In addition, as described in the second embodiment, a vehicle to be the track tracing target is not limited to a vehicle traveling in front of the self-vehicle. FIG. 6B shows an example of a case in which a following vehicle is set as the track tracing target. FIG. 6B is a view for explaining for explaining a situation in which an emergency vehicle 614 is approaching a vehicle 611 from the rear right side in the periphery of the vehicle 611. Assume that the vehicle width of a following vehicle 613 to be the track tracing target is smaller than the vehicle width of the vehicle 611. Also, assume that the positions of white lines 612 have been detected.

In this case, the travel position of the vehicle 611 can be determined to be a travel position where the right end of the vehicle 611 matches the right end (that is, the side on which the emergency vehicle 614 is approaching) of the following vehicle 613. As a result, the distance between vehicles when the emergency vehicle 614 is to pass the vehicle 611 will be equal to the distance between vehicles when the emergency vehicle 614 is to pass the following vehicle 613, and the vehicle 611 need not move more than necessary to a side opposite to the side of the emergency vehicle 614. Hence, for example, in a case in which the space of the shoulder is narrow, the self-vehicle will be able to travel at a safer travel position.

Other Embodiments

In the above-described embodiments, the tracing method used when travel support control is to be executed was switched based on the periphery information. In addition, the switching timing may be controlled based on the arrangement of the road on which the self-vehicle is traveling. For example, it may be arranged so that the switching timing will be delayed in a case in which the location where the self-vehicle is traveling is a predetermined area such as an intersection, a railroad crossing, or the like. A predetermined area such as that described above may not have the white lines or may have a characteristic different from that of a normal road arrangement. If switching is performed in such an area, the travel support control of the vehicle may not be performed stably.

More specifically, if the self-vehicle is traveling in a predetermined area when it is determined that the tracking method will be switched from track tracing to white line tracing, the switching will be performed after the self-vehicle has passed the predetermined area. By changing the tracing method after the self-vehicle has moved from such a predetermined area, travel support control can be executed stably without receiving the influence from the temporary road arrangement. Note that the predetermined area is not limited to those described above, and may include another road arrangement.

Additionally, in the above-described embodiments, control was performed so that track tracing will be performed when an emergency vehicle is approaching. In this case, the width of the road on which the self-vehicle is traveling may be considered. For example, in case in which the road on which the self-vehicle is traveling is formed by a plurality of lanes and only a few peripheral vehicles are present, control may be performed so the switching of the tracing method will not be executed by determining that the emergency vehicle will be able to pass without a problem. Also, in a case in which the width of the road on which the self-vehicle is traveling is equal to or more than a predetermined width, control may be performed so the switching of the tracing method will not be executed by determining that the emergency vehicle will be able to pass without a problem.

In addition, even in a case in which the self-vehicle is traveling on the center of the lane, when a space, which is equal to or more than a predetermined size, is open on one of the left and right sides of the lane, control may be performed so the switching of the tracing method will not be executed by determining that the emergency vehicle will be able to pass without a problem. Also, even in a case in which the self-vehicle has performed an operation (an offset operation) to open a travel space for the emergency vehicle, when the width of the road on which the self-vehicle is traveling is equal to or less than a predetermined width, control may be performed so the switching of the tracing method will not be executed by determining that a space through which an emergency vehicle can pass cannot be ensured. Alternatively, even if the tracing method is switched, control may be performed in accordance with the width of the road at that point so the offset operation will not be executed.

Also, in a case in which travel support control by track tracing is to be performed when an emergency vehicle is approaching, control may be performed to limit the amount of movement in the lateral direction for a predetermined time from the start of this control operations and to cancel this limitation after the predetermined time has elapsed. This will suppress a rapid lateral movement and allow the occupant to ride in the vehicle with a sense of security.

Furthermore, the switching timing of the tracing method may be controlled in accordance with the degree of urgency of an emergency vehicle. For example, in a case in which the degree of urgency is determined to be high, the tracing method will be switched early (in a short time) from white line tracing to track tracing. On the other hand, it may be arranged so that the period in which the tracing method is switched from white line tracing to track tracing will be set to be long in a case in which the degree of urgency is determined to be low. Alternatively, control may be performed so the switching to the track tracing will not be executed in a case in which the degree of urgency is determined to be low.

Summary of Embodiments

1. A control system of a vehicle according to the above-described embodiments is a control system (for example, 2) of a vehicle (for example, 1) that can travel in a first state in which travel control is performed based on a position of a white line on a travel lane and in a second state in which travel control is performed based on a travel position of another vehicle, comprising:

an obtainment unit (for example, 2) configured to obtain periphery information of the vehicle;

a determination unit (for example, 2) configured to determine, based on the periphery information obtained by the obtainment unit, that an emergency vehicle is approaching; and a control unit (for example, 2) configured to perform control so that the travel control by the first state is prioritized when the determination unit determines that the emergency vehicle is not approaching, and so that the travel control by the second state is prioritized when the determination unit determines that the emergency vehicle is approaching.

According to this embodiment, appropriate travel control can be provided to the self-vehicle when an emergency vehicle is present in the periphery.

2. In the above-described embodiments, when the emergency vehicle is approaching, the control unit performs the travel control by the second state based on a position in a lateral direction of the vehicle in at least one of the front side and the rear side of the vehicle.

According to this embodiment, when an emergency vehicle is present in the periphery, appropriate travel control can be provided to the self-vehicle based on a preceding vehicle and a following vehicle positioned in the periphery of the self-vehicle.

3. In the above-described embodiments, the control unit performs control to prioritize the travel control by the second state in a case in which the emergency vehicle is determined to have approached within a predetermined range from the vehicle, and performs control to prioritize the travel control by the first state in a case in which the emergency vehicle is determined to have fallen outside the predetermined range.

According to this embodiment, appropriate travel control can be provided to the self-vehicle in accordance with the state of the approach of the emergency vehicle.

4. In the above-described embodiments, in a case in which state switching is to be performed, the control unit switches the state step by step based on the position of the white line on the travel lane and the travel position of the other vehicle.

According to this embodiment, the vehicle can travel safely by preventing a rapid change when the tracing method is switched in the travel support control.

5. In the above-described embodiments, in a case in which the vehicle is traveling a predetermined area when the second state is to be switched to the first state, the control unit performs the switching after the vehicle has passed the predetermined area.

According to this embodiment, the vehicle can travel stably by preventing a transient operation in a predetermined area such as an intersection or the like.

6. In the above-described embodiments, the control system further comprises: a unit (for example, 23, 25) configured to determine, based on the periphery information, a degree of urgency of the approach of the emergency vehicle, wherein the control unit controls whether to switch to the travel control by the second state in accordance with the degree of urgency.

According to this embodiment, the tracing method can be switched in travel support control in correspondence with the degree of urgency of the emergency vehicle, thus allowing wasteful switching to be suppressed. As a result, it is possible to the vehicle to travel stably.

7. In the above-described embodiments, the obtainment unit obtains the periphery information by one of sound detection by a sound detection unit and communication with an external device by a communication unit.

According to this embodiment, information related to the approach of the emergency vehicle can be detected appropriately by the sound emitted from the emergency vehicle and communication with an external device.

8. In the above-described embodiments, the control unit controls whether to switch to the travel control by the second state based on a width of a road.

According to this embodiment, the tracing method can be switched in travel support control in correspondence with the state of the road on which the self-vehicle is traveling when the emergency vehicle is approaching, thus allowing wasteful switching to be suppressed. As a result, it is possible to the vehicle to travel stably.

9. In the above-described embodiments, in a case in which the width of the road is smaller than a predetermined width in the travel control by the second state, an offset operation with respect to the emergency vehicle is not performed.

According to this embodiment, even if the emergency vehicle is approaching, an operation to avoid the emergency vehicle will not be performed when a sufficient space cannot be ensured on the road on which the self-vehicle is traveling. As a result, it will be possible to suppress a wasteful operation and allow the vehicle to travel stably.

10. In the above-described embodiments, the control unit eases a limit value of the travel control by the second state which is performed when the emergency vehicle is determined to be approaching compared to a limit value of the travel control by the second state when the emergency vehicle is determined not to be approaching.

According to this embodiment, an operable range is widened more when the emergency vehicle is approaching than during a normal state so that a smooth vehicle flow will be possible.

11. In the above-described embodiments, the limit value is one of a limit value of a range permitting travel on a road and a limit value on an amount of movement during travel.

According to this embodiment, control can be performed in a wider operable range if the emergency vehicle is approaching than during a normal state.

12. In the above-described embodiments, when switching to the second state, the control unit sets a limit on an amount of movement during travel for a predetermined period from the start of the switching.

According to this embodiment, control accompanied by a rapid operation change is suppressed so that the sense of insecurity of the occupant can be reduced.

13. In the above-described embodiments, the control system further comprises: a communication unit (for example, 91, 92) configured to notify, when the determination unit has determined that the emergency vehicle is approaching, an occupant of the vehicle that control is being performed to prioritize the travel control by the second state.

According to this embodiment, the sense of insecurity of the occupant can be reduced by notifying the occupant of the driving support control to be performed in accordance with the approach of the emergency vehicle.

14. A control method of a vehicle according to the above-described embodiments is a control method of a vehicle (for example, 1) that can travel in a first state in which travel control is performed based on a position of a white line on a travel lane and in a second state in which travel control is performed based on a travel position of another vehicle, the method comprising:

obtaining periphery information of the vehicle;

determining, based on the periphery information obtained in the obtaining, that an emergency vehicle is approaching; and performing control so that the travel control by the first state is prioritized when the emergency vehicle is determined not to be approaching in the determining, and so that the travel control by the second state is prioritized when the emergency vehicle is determined to be approaching in the determining.

According to this embodiment, appropriate travel control can be provided to the self-vehicle when an emergency vehicle is present in the periphery.

15. A non-transitory computer-readable storage medium according to the above-described embodiments is a non-transitory computer-readable storage medium storing a program for causing a computer (for example, 2), for controlling a vehicle (for example, 1) that can travel in a first state in which travel control is performed based on a position of a white line on a travel lane and in a second state in which travel control is performed based on a travel position of another vehicle, to function as an obtainment unit (for example, 2) configured to obtain periphery information of the vehicle;

a determination unit (for example, 2) configured to determine, based on the periphery information obtained by the obtainment unit, that an emergency vehicle is approaching; and a control unit (for example, 2) configured to perform control so that the travel control by the first state is prioritized when the determination unit determines that the emergency vehicle is not approaching, and so that the travel control by the second state is prioritized when the determination unit determines that the emergency vehicle is approaching.

According to this embodiment, appropriate travel control can be provided to the self-vehicle when an emergency vehicle is present in the periphery.

The invention is not limited to the foregoing embodiments, and various variations/changes are possible within the spirit of the invention.

What is claimed is:

1. A control system of a vehicle that can travel in a first state in which travel control is performed based on a position of a white line on a travel lane and in a second state in which travel control is performed based on a travel position of another vehicle, comprising:

an obtainment unit configured to obtain periphery information of the vehicle;

a determination unit configured to determine, based on the periphery information obtained by the obtainment unit, that an emergency vehicle is approaching; and a control unit configured to perform control so that the travel control by the first state is prioritized when the determination unit determines that the emergency vehicle is not approaching, and so that the travel control by the second state is prioritized when the determination unit determines that the emergency vehicle is approaching, where the travel control in the second state is based on a position, in a lateral direction, of another vehicle which is different from the emergency vehicle and travels on the same lane as the vehicle.

2. The system according to claim 1, the control unit performs control to prioritize the travel control by the second state in a case in which the emergency vehicle is determined to have approached within a predetermined range from the vehicle, and performs control to prioritize the travel control by the first state in a case in which the emergency vehicle is determined to have fallen outside the predetermined range.

3. The system according to claim 1, wherein in a case in which state switching is to be performed, the control unit switches the state step by step based on the position of the white line on the travel lane and the travel position of the other vehicle.

4. The system according to claim 1, wherein in a case in which the vehicle is traveling a predetermined area when the second state is to be switched to the first state, the control unit performs the switching after the vehicle has passed the predetermined area.

5. The system according to claim 1, further comprising: a unit configured to determine, based on the periphery information, a degree of urgency of the approach of the emergency vehicle, wherein the control unit controls whether to switch to the travel control by the second state in accordance with the degree of urgency.

6. The system according to claim 1, wherein the obtainment unit obtains the periphery information by one of sound detection by a sound detection unit and communication with an external device by a communication unit.

7. The system according to claim 1, wherein the control unit controls whether to switch to the travel control by the second state based on a width of a road.

8. The system according to claim 7, wherein in a case in which the width of the road is smaller than a predetermined width in the travel control by the second state, an offset operation with respect to the emergency vehicle is not performed.

9. The system according to claim 1, wherein the control unit eases a limit value of the travel control by the second state which is performed when the emergency vehicle is determined to be approaching compared to a limit value of the travel control by the second state when the emergency vehicle is determined not to be approaching.

10. The system according to claim 9, wherein the limit value is one of a limit value of a range permitting travel on a road and a limit value on an amount of movement during travel.

11. The system according to claim 1, wherein when switching to the second state, the control unit sets a limit on an amount of movement during travel for a predetermined period from the start of the switching.

12. The system according to claim 1, further comprising: a communication unit configured to notify, when the determination unit has determined that the emergency vehicle is approaching, an occupant of the vehicle that control is being performed to prioritize the travel control by the second state.

13. A control method of a vehicle that can travel in a first state in which travel control is performed based on a position of a white line on a travel lane and in a second state in which travel control is performed based on a travel position of another vehicle, the method comprising:
- obtaining periphery information of the vehicle;
- determining, based on the periphery information obtained in the obtaining, that an emergency vehicle is approaching; and
- performing control so that the travel control by the first state is prioritized when the emergency vehicle is determined not to be approaching in the determining, and so that the travel control by the second state is prioritized when it is determined that the emergency vehicle is approaching, where the travel control in the second state is based on a position, in a lateral direction, of another vehicle which is different from the emergency vehicle and travels on the same lane as the vehicle.

14. A non-transitory computer-readable storage medium storing a program for causing a computer, for controlling a vehicle that can travel in a first state in which travel control is performed based on a position of a white line on a travel lane and in a second state in which travel control is performed based on a travel position of another vehicle, to function as
- an obtainment unit configured to obtain periphery information of the vehicle;
- a determination unit configured to determine, based on the periphery information obtained by the obtainment unit, that an emergency vehicle is approaching; and
- a control unit configured to perform control so that the travel control by the first state is prioritized when the determination unit determines that the emergency vehicle is not approaching, and so that the travel control by the second state is prioritized when the determination unit determines that the emergency vehicle is approaching, where the travel control in the second state is based on a position, in a lateral direction, of another vehicle which is different from the emergency vehicle and travels on the same lane as the vehicle.

* * * * *